Patented June 3, 1941

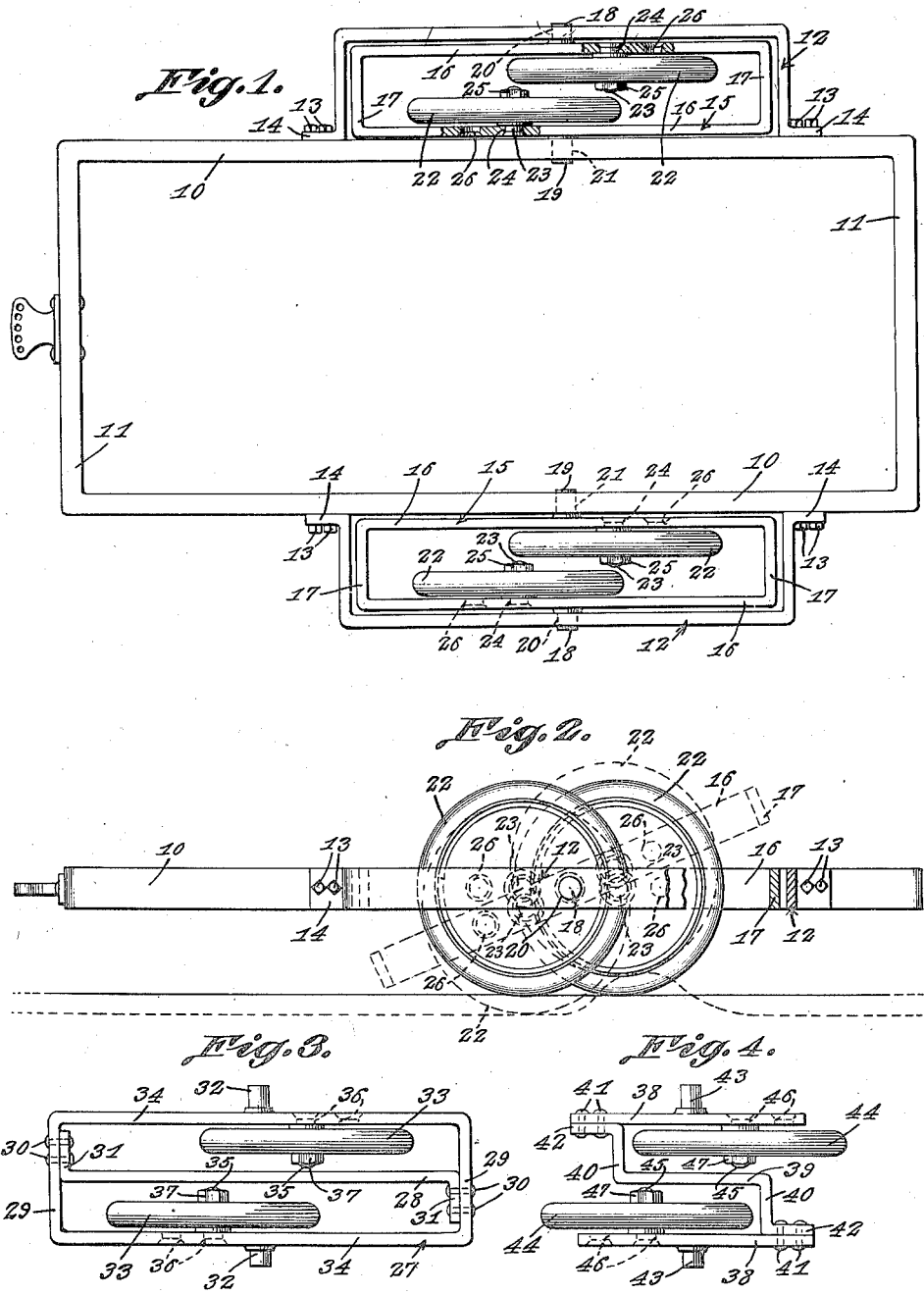

2,244,510

UNITED STATES PATENT OFFICE 2,244,510

ROCKER WHEEL ASSEMBLY

John Anderson, Funk, Nebr.

Application April 15, 1940, Serial No. 329,767

1 Claim. (Cl. 280—80)

This invention relates to rocker wheel assemblies and has for an object to provide a rocker frame having two staggered wheels mounted therein, that is, one wheel is disposed laterally of and somewhat in advance of the other, the rocker frame being adapted to be pivotally mounted in a non-rocking frame which is fixedly mounted on the frame of a machine or vehicle, preferably of the farm type, such as a grain binder, the rocking frame permitting the wheels to move up and down in travelling over corn rows and furrows so that the shock on the machine will be diminished as well as vibration diminished so that the long life of the machine will be promoted.

A further object is to provide apparatus of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a plan view of the frame of a machine equipped with a pair of ground wheel assemblies constructed in accordance with the invention.

Figure 2 is a side elevation of the machine frame and one of the ground wheel assemblies shown in Figure 1 with parts broken away.

Figure 3 is a plan view of a modified form of the ground wheel assembly.

Figure 4 is a plan view of another modified form of the ground wheel assembly.

Referring now to the drawing in which like characters of reference designate similar parts in the various views, 10 designates the longitudinal frame bars and 11 the transverse frame bars of the frame of a machine, such as a combine or grain binder, although the frame may be the frame of any machine or vehicle. In carrying out the invention the rocker wheel assembly comprises a pair of non-rocking frames 12 of U-shape in plan adapted to be secured to the longitudinal bars 10 through the medium of bolts 13 passed through apertured flanges 14 on the non-rocking frame and through the frame bars 10.

Mounted within the non-rocking frames are rocking frames 15 of narrow elongated formation. The rocking frames 15 each comprise parallel longitudinal frame bars 16 and parallel end frame bars 17, the former being equipped with pivot shafts 18 and 19 aligned transversely of the frame and received respectively in an opening 20 formed in the longitudinal frame bar of the non-rocking frame and an opening 21 formed in the frame bar 10 of a machine frame. Thus the frame 16 may rock on a horizontal axis of rotation as shown by dotted lines in Figure 2.

A pair of ground wheels 22 are associated with each rocking frame 15, the ground wheels being mounted in staggered relation longitudinally of the frame, the wheels also being disposed on opposite sides of the center line of the pivot shafts 18 and 19 of the rocking frame, as best shown in Figure 1. Each wheel is mounted upon a respective stub axle 23 which is mounted in an opening 24 in the respective longitudinal bar 16 of the rocking frame. The axle is equipped with a nut 25 to permit the wheel being applied and removed. For adjustably mounting each ground wheel longitudinally of the rocking frame at least one additional opening 26 is formed in the respective longitudinal bar 16 of the rocking frame 15 to interchangeably receive the stub axle 23. The stationary frame and the rocking frame form fenders to deflect plants from the ground wheels.

The modified form of the invention is shown in Figure 3 in which the rocking frame 27 is substantially oblong in top plan and is provided centrally with a longitudinal brace bar 28, the ends of which are secured to the end bars 29 of the frame through the medium of bolts 30 passed through the end bars and through flanges 31 formed on the ends of the brace bar. The rocking frame, as previously described, is provided with oppositely aligned pivot shafts 32 adapted to be received in respective openings in the non-rocking frame and in the adjacent longitudinal frame bar of the machine frame. Ground wheels 33 are mounted in stepped relation on the longitudinal bars 34 of the rocking frame, through the medium of pivot shafts 35 which are interchangeably received in openings 36 formed in the longitudinal bars of the rocking frame and are equipped with nuts 37 to permit application and removal of the ground wheels.

In Figure 4 is shown another modified form of the invention in which the rocking frame provides spaced longitudinal bars 38 which are connected together by an intermediate longitudinal bar 39 having oppositely directed ends 40 which are secured to the longitudinal bars by bolts 41 passed through the ends of the longitudinal bars and through flanges 42 formed on the intermediate longitudinal bars. In this form of the invention also the longitudinal bars are equipped with pivot shafts 43 adapted to be received in transversely aligned openings in the non-rocking frame and in the respective longitudinal frame bars of the machine frame. A pair of stepped ground wheels 44 are mounted on the longitudinal bars 38 through the medium of pivot shafts 45 which are interchangeably received in openings 46 formed in the longitudinal bars 38. The pivot shafts are equipped with nuts 47 to permit application and removal of the ground wheels.

In operation when the machine is being hauled across a corn field, for example, in which alternate rows of corn stubble and intermediate furrows exist, the rocking frame will be tilted on its pivot shaft, as best shown in Figure 4, when one of the ground wheels of each rocker wheel assembly strikes a furrow to permit the other ground wheel riding down into the furrow. Thus front ground wheels are always in contact with the ground to support the farm machine, but by this up and down movement jar on the machine will diminish since when the leading wheel of the assembly strikes the furrow it will let the machine sink or gravitate only one half the usual distance and when the following wheel arrives at the furrow the leading wheel will again be up on level ground. Consequently, the farm machine will ride easier and will require less horsepower in hauling, while at the same time the cushioning of shocks and jars and the minimizing of virbration will promote the long life of the machine.

From the above description it is thought that the construction and operation of the invention will be fully understood without further explanation.

What is claimed is:

In a farm vehicle, the combination with a longitudinal frame bar of the vehicle, of a stationary frame secured to the longitudinal bar, said frame being narrow and elongated longitudinally of the vehicle frame bar, a narrow elongated rocking frame disposed within the enclosure of the stationary frame and comprising longitudinal bars extending longitudinally of the stationary frame and transverse end bars disposed adjacent to the ends of the stationary frame, pivot shafts disposed centrally of and aligned transversely of the longitudinal bars of the rocking frame received respectively in an opening formed in the stationary frame and in the longitudinal bar of the vehicle frame and mounting the rocking frame in the stationary frame on a horizontal axis of rotation, stub axles fixed to respective longitudinal bars of the rocking frame and extending transversely of the rocking frame, the stub axles being disposed on opposite sides of the axis of the aligned pivot shafts of the rocking frame, staggered ground wheels carried by respective stub axles, and nuts on the free ends of the stub axles removably securing the ground wheels to the stub axles, the stationary frame and the rocking frame forming fenders to deflect plants away from the ground wheels.

JOHN ANDERSON.